(12) United States Patent
Spittle

(10) Patent No.: US 6,360,478 B1
(45) Date of Patent: Mar. 26, 2002

(54) MECHANICALLY BONDED FIBER MULCH AND PROCESS FOR PRODUCING SAME

(75) Inventor: Kevin S Spittle, Stanley, NC (US)

(73) Assignee: Profile Products L.L.C., Buffalo Grove, IL (US)

( * ) Notice: Subject to any disclaimer, the term of this patent is extended or adjusted under 35 U.S.C. 154(b) by 0 days.

(21) Appl. No.: 09/598,657

(22) Filed: Jun. 21, 2000

(51) Int. Cl.⁷ ................................. C09K 17/52
(52) U.S. Cl. ............................. 47/9; 119/172
(58) Field of Search ................ 47/9; 119/171, 119/172

(56) References Cited

U.S. PATENT DOCUMENTS

| | | | |
|---|---|---|---|
| 4,369,597 A | * | 1/1983 | Leep et al. ............... 47/9 |
| 5,017,319 A | | 5/1991 | Shen |
| 5,195,465 A | * | 3/1993 | Webb et al. ............ 119/172 |
| 5,741,832 A | | 4/1998 | Spittle |
| 5,779,782 A | | 7/1998 | Spittle |
| 5,909,718 A | * | 6/1999 | Sheechan ................ 119/172 |

FOREIGN PATENT DOCUMENTS

| | | | |
|---|---|---|---|
| EP | 0 161 766 A1 | | 11/1985 |
| EP | 0 492 016 A1 | | 7/1992 |
| GB | 2254769 A | * | 10/1992 |

* cited by examiner

Primary Examiner—Peter M. Poon
Assistant Examiner—Jeffrey Gellner
(74) Attorney, Agent, or Firm—Brooks & Kushman P.C.

(57) ABSTRACT

Completely biodegradable mulch products which form a mechanically-bonded yet open fiber mulch matrix contain natural fibers and interlockable crimped natural fibers, the crimped natural fibers being crimped by a process which induces a water-resistant permanent crimp.

19 Claims, No Drawings

MECHANICALLY BONDED FIBER MULCH AND PROCESS FOR PRODUCING SAME

TECHNICAL FIELD

This invention relates to a fiber mulch for application to seed beds.

BACKGROUND ART

Various types of mulches are commonly applied over seed beds. The purpose of these mulches is to increase seed germination and decrease soil erosion to allow the seedlings to become firmly established in the seeded area. These mulches typically consist of natural materials such as straw, wood shavings, or paper. The mulches are mixed with water and agitated in a holding tank, and then sprayed onto the seed bed. Some such mulches are woven into blankets that are designed to be laid down over seed beds.

Such mulches are somewhat effective. They do absorb and retain some water, thus keeping the seed bed more hydrated then when mulch is not used. They additionally deflect some of the rain, thereby decreasing to some extent soil erosion. However, most such mulches are loose configurations of unbonded fibers that easily wash away. The paper-based mulches tend to bond into a paper mache-like mat that inhibits oxygen and sunlight transfer, and the ability of seedlings to emerge through the mulch, thus affecting the vegetation establishment.

There have also been introduced into the market chemically bonded natural fiber spray-applied mulches. These mulches use a vegetable gum binder such as guar gum to bind together natural fibers. Although this mulch is extremely well bonded, it has not been successful for a number of reasons. The chemically-bonded mulch forms an almost impenetrable layer over the seed bed that is poor at passing the needed oxygen and water through to the seed bed, and is also very difficult for the germinated seedlings to penetrate. Accordingly, the results for this product have been poor.

It has previously been proposed by the present inventor to provide mulches employing natural fibers derived from straw, wood, etc., along with crimped thermoplastic polyester fibers which, following application, link together to form a coherent matrix which is still open enough to admit light and air. However, the crimped polyester fibers have been shown to decompose but slowly, if at all, in the soil, and thus, even though present in relatively small quantities, are not environmentally optimal. Natural fibers are biodegradable, but have not been used in crimped form. The crimping of natural fibers is ordinarily not permanent, and thus the ability of the fibers to interlock is destroyed as the fibers are exposed to light and moisture, particularly to the water in the mulch tank.

DISCLOSURE OF INVENTION

This present invention features a mechanically-bonded fiber mulch, comprising mulch fibers, and permanently crimped natural fibers, intimately mixed together to form a mechanically-bonded fiber mulch in which the synthetic fibers hold together the mulch fibers. A polymer-based water absorbent may be dispersed throughout the fiber mulch to increase the mulch water absorption capacity. The mulch product may also contain synthetic binders, or more preferably, natural binders, fertilizer, and other traditional mulch ingredients including, when appropriate, seeds.

BEST MODE FOR CARRYING OUT THE INVENTION

The mulch fibers may comprise as much as 99.5% (by weight) of the mulch, and preferably comprise about 65% to 90% of the mulch. However, as indicated subsequently, mulches with lower non-crimped fiber content are also useful with appropriate crimped fibers. Natural fibers such as wood, paper, straw and/or excelsior mulch fibers are the preferred natural fibers, although other natural fibers such as jute and many other types of available natural fibers may be used.

The crimped fibers preferably comprise about 2% to 15% (by weight) of the mulch, and more preferably approximately 3–8%, most preferably about 5%. However, in some cases, the crimped fibers may comprise a major part or substantially all of the mulch, for example up to 100%, preferably 0.5% to 100% more preferably up to 90%, and yet more preferably up to 50%. The preferred fibers are relatively short (preferably about ½" long) crimped fibers that interlock to one another and to the mulch fibers to create an open, yet mechanically bonded, fiber matrix that remains in place even on steep slopes, yet is open enough to allow water and oxygen to pass through into the seed bed, and allow the seedlings to grow up through the matrix. The average fiber length on a weight basis should not be less than 0.25 inch, and preferably not less than 0.375 inch, but may be as long as several inches, so long as the mulch remains pumpable and sprayable. With longer fibers, it is expected that the average fiber length may decrease when agitated in the mulch tank. The lengths cited are dry lengths prior to application.

The mulch preferably contains a polymer-base water absorbant. The polymer-based water absorbent is preferably present at about 5% to 15% of the mulch weight. The water absorbent is preferably a powder such as a polyacrylamide-based copolymer powder that absorbs many times its own weight in water. Natural absorbants are also useable.

The fiber mulch prevents erosion both because of the mechanical properties of the mulch as well as its water-absorbent properties. The water absorbency provides a longer lasting, more even hydration of the seed and seedlings to maximize germination and plant growth. The matrix is sufficiently open to allow air to easily pass through to further foster plant growth. The natural fibers both crimped and non-crimped, degrade slowly, providing long term erosion control.

The mulch is preferably produced by entraining the natural fibers in an air stream, and introducing into this air stream the permanently crimped natural fibers in the desired ratio of crimped natural fibers to uncrimped natural fibers, to create an intimately mixed, mechanically-bonded fiber mulch. The polymer-based water absorbent is then dispersed into the fiber mulch to increase its water absorption capacity. The water absorbent is preferably mechanically dispersed into the mixed mulch fiber-crimped synthetic fiber mulch.

It has now been unexpectedly discovered that certain natural fibers can be employed as crimped fibers. Despite their natural origin, natural fibers, with suitable treatment, can be crimped to form a permanently crimped fiber which provides for interlocking to a degree similar to crimped polyester fibers, but are completely biodegradable. The fibers are natural or modified natural fibers which are crimped under such circumstances that the crimp is permanent, due to thermochemical reaction of the fiber materials, coatings thereon, or impregnants therein.

In its most preferred embodiment, the present invention pertains to a mechanically-bonded, fiber mulch, preferably including approximately 80–90% by weight mulch fibers, such as wood and/or paper fibers, approximately 5–10% by weight crimped fibers, and approximately 5% by weight polymer-based water absorbent powder. This invention is not limited to the particular materials chosen, nor the particular preferred materials ratios. The fiber mulch of the invention is a mechanically-bonded open weave accomplished by reason of the crimped fibers' entanglement with one another and with the mulch fibers to hold the mulch fibers together in a matrix which is sufficiently open to allow air to pass through, and seedlings to grow up through. A polymer-based water absorbent such as a polyacrylamide-based powder may be dispersed throughout the matrix to increase the water-holding capacity of the mulch so that more water is provided to the seed bed, and water run-off is inhibited. The mulch may also contain mulch flakes, including flakes of paper in quantities less than that which will coalesce in the presence of moisture to form a barrier layer. The amount of such flakes is desirably no more than 15 percent by weight, preferably less than 10 weight percent, and more preferably less than 5 weight percent.

The invention thus also pertains to a mulch, product mixable with water to from a hydro-mulch suitable for spray application to soil to form an open, mechanically-bonded mulch on the surface of soil to which the hydro-mulch is applied, the mulch product comprising up to 97% of mulch ingredients, these mulch ingredients comprising up to 97% by weight natural fibers which are substantially non-crimped, and up to 15 weight percent of flaked mulch product comprising paper flakes or lignocellulosic flakes comprising a paper component and at least one other lignocellulosic component, lignocellulosic flakes prepared by flaking pellets formed of the paper component and the lignocellulosic component. The mulch product also contains from 3% to 100% of a permanently crimped natural fiber, these permanently crimped natural fibers being imparted with a water resistant, permanent crimp by one or more of several processes. These processes include crimping a natural fiber precursor under conditions (optionally including moisture), at a temperature high enough to induce a permanent crimp in the natural fiber; or crimping a natural fiber precursor coated and/or impregnated with a thermosettable synthetic resin, the crimping taking place prior to or after coating with the thermosettable synthetic resin.

Natural fibers in one embodiment comprise wood fibers of about one-eighth to three-quarters inch in length. Wood fibers provide a quality natural mulch. However, such natural fibers do not bond together well. Thus, when they are used alone in a mulch, the mulch is easily disturbed on the surface, allowing heavy rains to wash the mulch, seed, and soil from sloped surfaces, thus greatly decreasing the effectiveness of the mulch. To overcome such problems, the wood fibers in this the present invention are intimately mixed with permanently crimped natural fibers which are preferably crimped fibers about ½" in length, with preferably three to eight, more preferably six, acute, preferably about 90 degree bends (crimps) along the length of the average fiber. The bend angle is not critical so long as fiber entanglement is facilitated. Thus, bends of greater or lesser angles are also possible. The crimped fibers hold onto one another and to the wood fibers fairly tenaciously. The crimped fibers detailed above may be pretreated with a surfactant and dispersant agent to allow them to mix more easily with water just before application to the seed bed.

It has been found that the ratio of such crimped fibers to the mulch fibers can be varied over a wide range to create a mechanically-bonded fiber mulch that can be spray applied to seed beds. Too much of the crimped fiber causes too much entanglement, which makes the product difficult to keep uniformly mixed in the spray applicator, and thus difficult to uniformly apply. Too little crimped fiber does not sufficiently bond together the mulch fibers to create the results obtained by the mulch of the present invention. Use of crimped fibers with lesser crimping, i.e., three to four crimps per fiber, allows the use of larger amounts of the crimped fiber. Since the crimped fibers are biodegradable, there are no environmental limitations to the use of large amounts of the crimped natural fibers.

The invention is not limited to the use of any particular fiber as the "non-crimped" fiber making up the majority of the mulch, as long as crimped fibers, which generally but not necessarily make up the smaller proportion of the overall amount of fiber in the mulch, are present in the mulch. Thus, wood fibers are just one possibility for such fibers. Waste paper fibers are also within the scope of this invention, as are other traditional mulch fibers, including straw and excelsior. In each case, the crimped fibers act to mechanically bind together the other mulch fibers, thus increasing the tenacity of the mulch.

The polymer-based water absorbent (which may be present, but is not required) is preferably a powder that is mixed with the bonded fiber matrix, preferably by mechanical mixing. A preferred water absorbent polymer material is "TACKING AGENT III" available from Profile Products LLC, Buffalo Grove, Ill. TACKING AGENT III is a copolymer of polyacrylamide that absorbs five to ten times its own weight in water. The absorbent 16 thus increases the water-absorption capability of the mulched seed bed, thus providing better hydration to the seed and seedlings, which leads to quicker germination, more complete germination, and more plant mass per acre. A surfactant may be added as well to increase the water absorption of the wood fiber.

The crimped fibers of the present invention are of natural origin in order that they may be rapidly decomposable following use. At the same time, the natural fibers must be permanently crimped. By permanently crimped is meant that the fibers retain a significant portion of their original "set" of "crimp" following mixing in the mulch tank and application to the soil. The crimped fibers should be capable of performing their interlocking function following exposure to light and moisture for extended periods following application to the soil. Fibers which straighten under such circumstances, or which experience a relaxation such that the crimp angles approach 180°, are not suitable for use herein, except in combination with permanently crimped fibers.

Suitable natural fibers include any available or which can be made available in the requisite lengths, preferably with an aspect ratio of at least 10, more preferably at least 15, and most preferably at least 20. Suitable fibers include fibers of coniferous and deciduous woods, cotton, wool, flax, jute, coconut, hemp, straw, grass, and other fibers available directly from natural sources, as well as chemical modifications which form fibers, for example chemically modified cellulose fibers, cotton fibers, etc., preferably cellulose acetate. Suitable natural fibers also include abaca, cantala, caroa, henequen, istle, Mauritius, phormium, bowstring, hemp, sisal, China jute, kenaf, ramie, roselle, sunn, cadillo, kapok, broom root, coir, crin vegetal, and piassaua. These lists of natural fibers are illustrative and not limiting. Examples of chemically modified fibers include azlon (regenerated natural proteins), regenerated cellulose products including cellulose xanthate (rayon), cellulose acetate, cellulose triacetate, cellulose nitrate, alginate fibers, casein-based fibers, and the like.

The natural fibers may not be simply mechanically crimped. Such purely mechanical crimping, for example between partially intermeshing toothed rollers, creates a crimped product which is incapable of retaining the necessary set following application, particularly in high humidity or wet (i.e., rain) environments. These products are likely to loose the majority of their set (crimp) when added to the mulch tank. Rather, the crimping must be performed at a temperature which is such to cause thermal (i.e., plasticization) or chemical (i.e., crosslinking or degradation into adhesive-like decomposition products) changes which cause the crimp to be maintained even in the presence of light and moisture. In some cases, the fibers may be treated with a coating or impregnant which allows the fibers to retain their set without modification of the fibers per se. Examples of such coatings are methylolurea resins, phenol formaldehyde resins, melamine formaldehyde resins, urea formaldehyde resins, furfural-derived resins, and the like. Many of these resins are commercially available, and are used as binders, for example in fiberglass products, or in fabric treatment to bestow anti-wrinkle performance. In the present case, the coatings are applied and cured during or after the crimping operation to make permanently crimped fibers as opposed to their normal use in keeping fibers straight (i.e., in wrinkle free fabrics). These resins, due to their thin coating and chemical content, are themselves biodegradable. Some of the resins perform a fertilizing function as they degrade over time, i.e., melamine-formaldehyde, urea-formaldehyde and urea-melamine-formaldehyde resins. Other resins, e.g., epoxy resins, novolac resins, etc., may also be used. However, they are, in general, less biodegradable than the resins previously identified, as well as being more expensive.

Thus, the fibers may be heat and/or steam treated, or may be crimped prior to cure of a curable coating and/or impregnant, or may employ a combination of such techniques, to create a permanently crimped fiber as that term is used herein. Chemically modified natural fibers such as cellulose acetate cellulose triacetate, and cellulose nitrate may be crimped at, above, or near their softening point. Unmodified lignocellulosic fibers such as cotton, flax, wool, etc., must in general be heated to relatively high temperatures, often in the presence of moisture (i.e., super-heated steam) to, for a time sufficient to partially break down some of the lignocellulosic or proteinaceous components.

Wood fibers, for example, and those of jute and coconut, may be heated in a moist atmosphere to a temperature and for a time where the fibers turn from golden brown to dark brown. Under these conditions, a natural adhesive is formed as a degradation product, as taught by U.S. Pat. No. 5,017, 319 and European Patents EP 0 161 766 and EP 492 016, herein incorporated by reference. Fibers crimped in this condition and then cooled, will have a set which allows the crimps to be maintained over an extended period of time, even in the presence of moisture.

The crimping conditions vary with each type of fiber, its source, and its method of preparation. Finding suitable crimping conditions is straightforward, however, and involves, for natural fibers without coatings, passing the fibers through crimping devices at various temperature and moisture levels, and testing for permanent crimp by exposing the crimped fibers to a warm, high, humidity environment. For example, the fibers may be placed in a metal tray in an environmentally controlled oven and periodically sprayed with a mist of water. Fibers which maintain their ability to interlock following such exposure have been treated successfully, assuming the mulch product containing these crimped fibers is to be dry-applied. For mulch products to be applied from mulch tanks, the fibers should be first immersed in water and agitated 15 minutes prior to testing as above.

When a coating and/or impregnant is used, the fibers may be crimped mechanically and then sprayed with a solution or dispersion of the coating/impregnant material, or may be first contacted with the solution or dispersion and then crimped. In either case, the crimping and coating operations must be consolidated such that a crimped product containing a coating or impregnated with a cured resin is obtained. For example, crimped fibers may be transported by hot air through a conduit into which a mist of phenol/formaldehyde resin is introduced, the temperature, air flow and turbulence being such that the resin substantially cures without excessive agglomeration of fibers. Alternatively, fibers may be transported on a belt or other transportation device in an uncrimped state, sprayed with curable resin and dried at a temperature insufficient to cause the resin to cure. The fibers, now coated with dry, curable resin, are then crimped at a higher temperature at which the resin cures. Alternatively, the coated fibers are crimped at a low temperature at which the resin does not cure, and are subsequently cured in a heated chamber or conduit. Fibers which became partially agglomeration in any of these processes may be mechanically separated, preferably immediately after curing of the resin, or during resin cure.

Because the interlocking fibers are themselves decomposable and suitable as mulch, the mulch may be produced entirely of the crimped fibers of desired. This is particularly the case where wood, jute, coconut, or hemp fibers etc., are used. When modified cellulose fibers, e.g., cellulose acetate fibers are used, it is preferable that the amount of fibers in weight percent be less than 20%, more preferably less than 10 weight percent.

A preferred process for producing the fiber mulch of this invention is disclosed in U.S. Pat. No. 5,779,782, herein incorporated by reference. Wood and/or paper fibers are entrained in an air flow within conduit. The proper amount of the crimped fiber is added to this entrained flow within the conduit upstream of a fan which provides air flow. The materials mix together and pass through the fan and into a surge storage container. The turbulence created in the air flow and by the fan intimately mixes the wood/paper and crimped fibers, to create a mechanically-bonded fiber mulch. The water absorbing powder (if present) is metered into this mixed mulch in a screw feeder which moves the mulch from storage to a bagger hopper. It has been found that this mechanical dispersion of the absorbent polymer powder is preferable to dispersion in the air stream, as the powder can be easily blown out of the matrix and lost, or unevenly dispersed in the matrix, as a result.

The mulch of this invention is preferably applied to areas being vegetated as follows. The mulch product, which is packed and shipped in bails, is added to the mixing tank of a standard hydro-seeding machine that uses mechanical or jet agitation. The fertilizer, seed and soil amendments can also be added if desired. Preferably, however, the seed bed is first prepared by mixing the seed, fertilizer, soil amendments, and a relatively small amount of the mulch of this invention and applying that to the seed bed. Then, one or two layers of the mulch in water are sprayed on top of the seed bed to form the protective, water-absorbent mulch matrix layer over the seed bed.

It has been found that the mulch of this invention is preferably applied at a rate of about 3000 pounds per acre for new turf beds. The mulch can also be used with other vegetative beds, such as crops.

Most preferably, the seed, fertilizer, soil amendments and 600 pounds of the mulch of this invention are mixed and spray applied to an acre of soil. When possible, a cultipacker or lawn roller is then run over the soil to improve the seed-to-soil contact.

A layer of the mulch of this invention is then spray applied over the prepared seed bed, preferably covering at least 95% of the seed bed. This can be accomplished by mixing 1200 pounds of the mulch of this invention in 3000 gallons of water and spray applying that to the one acre seed bed. A second application of the mulch at the same rate, when possible from the opposite direction of the first application, is then sprayed on in order to increase the soil coverage, and thus the mulch effectiveness.

The mulch of this invention, when applied in this manner and including the absorbent powder, has been found to decrease soil erosion from sloped surfaces by up to 30 times, and to reduce water runoff by up to 5 times, as compared to straw blanket and excelsior blanket mulch products. The mass of plants per acre grown under such conditions as compared to the other two mulches has been shown to be more than 50% greater, with much greater seedling germination rates as well.

Having now fully described the invention, it will be apparent to one of ordinary skill in the art that many changes and modifications can be made thereto without departing from the spirit or scope of the invention as set forth herein.

What is claimed is:

1. A mulch product mixable with water to from a hydro-mulch suitable for spray application to soil to form an open, mechanically-bonded mulch on the surface of soil to which said hydro-mulch is applied, said mulch product comprising:
   a) up to 97% of mulch ingredients comprising
      a)i) from 0 to 99.5% by weight natural fibers which are substantially non-crimped;
      b)ii) up to 15 weight percent of flaked mulch product comprising paper flakes, or lignocellulosic flakes comprising a paper component and at least one other lignocellulosic component, said lignocellulosic flakes prepared by flaking pellets formed of said paper component and said lignocellulosic component; and
   b) from 0.5% to 100% of a permanently crimped natural fiber, said permanently crimped natural fiber being imparted with a water resistant permanent crimp by one or more of
      b)i) crimping a natural fiber precursor exposed to a temperature high enough and for sufficient time, optionally in the presence of moisture, to induce a permanent crimp in said natural fiber; or
      b)ii) crimping a natural fiber precursor coated and/or impregnated with a thermosettable synthetic resin, said crimping taking place prior to or after coating and/or impregnating with said thermosettable synthetic resin,
said crimping sufficient to produce crimped fibers which entangle with other mulch components, thereby decreasing erosion of a soil surface on which said hydro-mulch is applied as compared to an otherwise similar mulch not containing said crimped natural fibers.

2. The mulch product of claim 1, wherein the natural fiber precursor comprises one or more optionally chemically modified natural fibers selected from the group consisting of wood fibers, cotton fibers, flax fibers, straw fibers, jute fibers, hemp fibers, and coconut fibers.

3. The mulch product of claim 1, wherein said natural fiber precursor is a cellulosic or lignocellulosic fiber derived from chemical digestion of lignocellulosic raw materials.

4. The mulch product of claim 1, wherein said fiber is a chemically modified cellulose.

5. The mulch product of claim 4, wherein said chemically modified cellulose is one or more of a cellulose xanthate, a cellulose acetate, a cellulose triacetate, or a cellulose nitrate.

6. The mulct product of claim 1 which further contains up to 15 weight percent, based on the weight of the mulch product, of mulch flakes.

7. The mulch product of claim 1, wherein said mulch product further contains one or more of a fertilizer, a mildewcide, a fungicide, a dye, a synthetic water absorbing substance, or a binder.

8. The mulch product of claim 7, wherein said binder is a natural gum product.

9. The mulch product of claim 8, wherein said natural gum comprises one or more gums selected from the group consisting of plantago, guar, tragacanth, acacia, and arabic.

10. The mulch product of claim 1, wherein said crimped fibers are cellulose acetate or cellulose triacetate fibers or mixtures thereof, present in an amount of less than 10 weight percent based on the weight of the mulch product.

11. The mulch product of claim 1, wherein said natural fiber precursor is a mixture of lignocellulosic fibers derived from comminuting natural sources of lignocellulose into fibers followed by heating said fibers in the presence of moisture to a temperature and for a time sufficient to produce an in situ generated adhesive, and crimping and cooling said fibers to form permanently crimped fibers.

12. The fibers of claim 11, wherein a thermosettable synthetic resin is added to said fibers prior to or following crimping to aid in crimp retention.

13. The mulch product of claim 1, wherein said natural fiber precursor is a fiber formed by comminuting a lignocellulosic natural product, crimping said fiber at an elevated temperature, coating said fiber with a curable synthetic resin, and curing said synthetic resin to form permanently crimped fibers.

14. The mulch product of claim 1, wherein said natural fiber precursor is a fiber formed by comminuting a lignocellulosic natural product, applying a curable synthetic resin to said fibers, and crimping and curing said fibers to form permanently crimped fibers.

15. The mulch product of claim 14, wherein said synthetic resin comprises an aqueous dispersion of a curable synthetic resin, and wherein prior to crimping and curing, the fibers are dried to produce dry fibers containing dried but at most partially cured thermosetting resin.

16. The mulch product of claim 1, wherein said permanently crimped natural fibers have an average length of 0.25 inch or more in an uncrimped state.

17. The mulch product of claim 1, wherein said permanently crimped natural fibers have an average length between about 0.375 inch and 1.5 inch.

18. The mulch product of claim 1, wherein said permanently crimped natural fibers are crimped prior to admixture with other crimped natural fibers or other hydro mulch ingredients.

19. The mulch product of claim 1, wherein said crimped fibers are present in an amount of 2% to 15% by weight relative to the total weight of the mulch, and are crimped prior to admixture with other mulch ingredients.

* * * * *

UNITED STATES PATENT AND TRADEMARK OFFICE
CERTIFICATE OF CORRECTION

PATENT NO. : 6,360,478 B1
DATED : March 26, 2002
INVENTOR(S) : Kevin S. Spittle

It is certified that error appears in the above-identified patent and that said Letters Patent is hereby corrected as shown below:

<u>Column 7,</u>
Line 27, "to from" should read -- to form --

<u>Column 8,</u>
Line 6, "mulct" should read -- mulch --

Signed and Sealed this

Eleventh Day of June, 2002

Attest:

JAMES E. ROGAN
Attesting Officer
Director of the United States Patent and Trademark Office